United States Patent
Shimura et al.

(10) Patent No.: US 9,362,031 B2
(45) Date of Patent: Jun. 7, 2016

(54) SEMICONDUCTOR CERAMIC COMPOSITION AND PTC THERMISTOR

(71) Applicant: TDK CORPORATION, Tokyo (JP)

(72) Inventors: Yoshikazu Shimura, Tokyo (JP); Kazuhiko Itoh, Tokyo (JP)

(73) Assignee: TDK CORPORATION, Tokyo (JP)

( * ) Notice: Subject to any disclaimer, the term of this patent is extended or adjusted under 35 U.S.C. 154(b) by 96 days.

(21) Appl. No.: 14/502,123

(22) Filed: Sep. 30, 2014

(65) Prior Publication Data

US 2015/0097650 A1    Apr. 9, 2015

(30) Foreign Application Priority Data

Oct. 3, 2013   (JP) .................. 2013-208022
Aug. 25, 2014  (JP) .................. 2014-170316

(51) Int. Cl.
  *H01C 7/02*  (2006.01)
  *H01C 7/00*  (2006.01)
  *H01C 1/14*  (2006.01)

(52) U.S. Cl.
  CPC ............ *H01C 7/025* (2013.01); *H01C 7/008* (2013.01); *H01C 7/027* (2013.01); *H01C 1/1406* (2013.01)

(58) Field of Classification Search
  CPC ...................................... H01C 7/025
  See application file for complete search history.

(56) References Cited

U.S. PATENT DOCUMENTS

| | | |
|---|---|---|
| 6,187,707 B1 | 2/2001 | Kakihara et al. |
| 2008/0170977 A1 | 7/2008 | Shimada et al. |
| 2010/0323877 A1 | 12/2010 | Shimada et al. |
| 2011/0011848 A1 | 1/2011 | Shimada et al. |
| 2012/0175361 A1* | 7/2012 | Ino ............... C01G 29/006 219/482 |
| 2014/0197156 A1* | 7/2014 | Ino ............... H01C 7/02 219/538 |
| 2015/0097650 A1* | 4/2015 | Shimura ........ H01C 7/025 338/22 SD |
| 2016/0005517 A1* | 1/2016 | Shimura ........ H01C 7/02 338/22 SD |
| 2016/0027560 A1* | 1/2016 | Itoh ............... H01C 7/02 338/22 R |

FOREIGN PATENT DOCUMENTS

| | | |
|---|---|---|
| CN | 102674831 A | 9/2012 |
| JP | S56-169301 A | 12/1981 |
| JP | 2009-227477 A | 10/2009 |
| JP | 2010-168265 A | 8/2010 |
| KR | 2000-0057151 A | 9/2000 |
| KR | 2012-0091432 A | 8/2012 |

OTHER PUBLICATIONS

Search Strategy Expert search from STIC/EIC—see paper labeled 14502123 STIC EIC Search result Mar. 4, 2016.pdf.*

* cited by examiner

*Primary Examiner* — James Harvey
(74) *Attorney, Agent, or Firm* — Oliff PLC

(57) ABSTRACT

A semiconductor ceramic composition which includes a compound represented by the following formula (1) as a main component, $(Ba_{1-x-y-w}Bi_xA_yRE_w)_m(Ti_{1-z}TM_z)O_3$  (1) (wherein, A is at least one element selected from Na or K, RE is at least one element selected from the group consisting of Y, La, Ce, Pr, Nd, Sm, Gd, Dy and Er, TM is at least one element selected from the group consisting of V, Nb and Ta, w, x, y, z and m satisfy the following relationships of (2)~(5), $0.007 \le x \le 0.125$ (2), $x < y \le 2.0x$ (3), $0 \le (w+z) \le 0.01$ (4), $0.94 \le m \le 0.999$ (5)). And the semiconductor ceramic composition includes Ca in a proportion of 0.01~0.055 mol in terms of element relative to 1 mol of Ti sites.

8 Claims, 1 Drawing Sheet

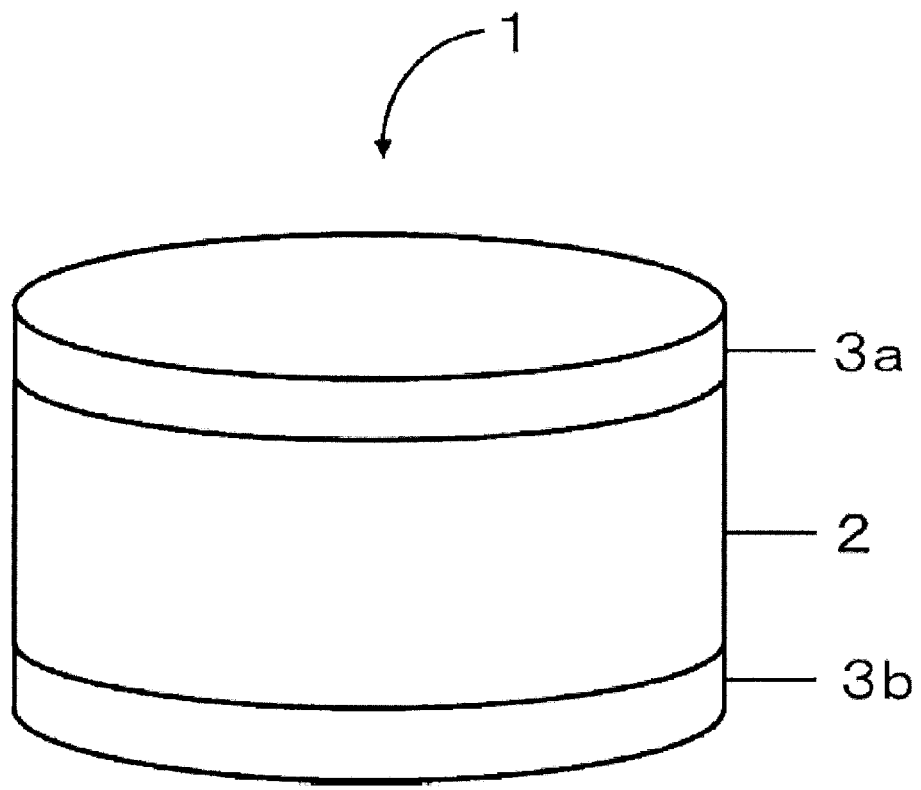

SEMICONDUCTOR CERAMIC COMPOSITION AND PTC THERMISTOR

The present invention relates to a semiconductor ceramic composition and PTC thermistor, which may be used in a heater element or an overheat detection sensor and the like.

BACKGROUND

As a thermistor, a PTC (Positive Temperature Coefficient) thermistor with a positive temperature coefficient of resistance α has been known. The PTC thermistor will have an increase in the resistance against the increase of the temperature, thus it can be used as a heater, an over current protection element, an overheat detection sensor and the like. In the prior art, a PTC thermistor has been obtained by adding a minute amount of rear earth elements and the like to barium titanate ($BaTiO_3$) which is the main component and forming it to a semiconductor. Therefore, it will have a sharp increase in the resistance by several orders of magnitude above the Curie temperature, while it has a low resistance under Curie temperature.

The Curie temperature of $BaTiO_3$ is usually 120° C. However, it can be shifted to a lower temperature by substituting a part of Ba with Sr or Sn. As for the shift of the Curie temperature to be higher, it has been realized by substituting a part of Ba with Pb at present. From the view point of the trend of decreasing the environmental load of the world, practical application of a substitute material with no Pb has been demanded.

In the following Patent Document 1, a method for producing a semiconductor ceramic composition has been disclosed. In the method, one or more of any of Nb, Ta or a rare earth element are added into a semiconductor ceramic composition consisting of $Ba_{1-2X}(BiNa)_XTiO_3$ (0<X≤0.15), in which a part of Ba is substituted with (Bi, Na) rather than Pb. Then, after the composition is sintered in nitrogen, it is heat-treated in an oxidation atmosphere.

In addition, in the following Patent Document 2, a method for producing a semiconductor ceramic composition has been disclosed. In the method, the sintered body of a semiconductor ceramic composition in which a part of Ba of $BaTiO_3$ is substituted with (Bi, Na), is applied to a heat-treatment under a temperature below 600° C. in air atmosphere after electrodes are formed on it, as a means to increase the change ratio of the increased resistance above the Curie temperature to the specific resistance at a normal temperature (herein after, referred as "temperature coefficient of resistance α").

Further, in the following Patent Document 3, a semiconductor ceramic composition without Pb has been disclosed. The composition is produced by preparing BT calcined powder consisting of $(BaR)TiO_3$ (wherein, R is at least one of rare earth elements) calcined powder or $Ba(TiM)O_3$ (wherein, M is at least one of Nb or Sb) calcined powder, and BNT calcined powder consisting of $(BiNa)TiO_3$ calcined powder, respectively, sintering the molded body prepared from the mixed calcined powders of the BT calcined powder and the BNT calcined powder in an atmosphere containing 1 vol % or less of oxygen, then applying the sintered body to a heat-treatment for 0.5 hours or more and 24 hours or less under a temperature of 300° C. or more and 600° C. or less in an atmosphere containing 0.1 vol % or more of hydrogen.

All of the above mentioned Patent documents have disclosed that, a semiconductor ceramic composition without using Pb, which has a Curie temperature shifted to a temperature higher than 120° C., a small specific resistance at a normal temperature, and a large temperature coefficient of resistance α, can be obtained.

PATENT DOCUMENTS

Patent Document 1: JPS56-169301A
Patent Document 2: JP2009-227477A;
Patent Document 3: JP2010-168265A;

SUMMARY

In the examples of the above mentioned Patent Document 1, the results of heat-treatment carried out in the oxidation atmosphere after adding Nd to the semiconductor ceramic composition of $Ba_{1-2X}(BiNa)_XTiO_3$ (0<X≤0.15) and sintering in nitrogen atmosphere has been disclosed. However, there is no detailed description regarding the case of adding other semiconducting agents, and it is not clear whether the performance is improved or what is the degree of the improvement of the performance. Further, as semiconductor cannot be formed by sintering in air atmosphere, there is a problem that the production cost will be increased compared to the case of sintering in air atmosphere.

Further, the semiconductor ceramic composition described in the above mentioned Patent Document 2 has a temperature coefficient of resistance α of about 10%/° C. However, it is known that the specific resistance at a normal temperature and the temperature coefficient of resistance α are in a trade-off relationship, thus there is a problem that it will not switch at the target temperature if the temperature coefficient of resistance α is decreased. Therefore, a larger temperature coefficient of resistance α as well as a specific resistance at a normal temperature suitable for practical use is expected.

In the above mentioned Patent Document 3, it is disclosed that a composition of $BaTiO_3$ with a part of Ba substituted by (Bi, Na) is sintered in a nitrogen atmosphere or an argon atmosphere with an oxygen concentration of less than 1 vol %, and then it is applied to a heat-treatment in a hydrogen atmosphere. However, as it cannot be made into a semiconductor by sintering in air atmosphere and a heat-treatment is necessary after sintering, there is a problem that the production cost will be increased compared to the case of sintering in the air atmosphere. Further, the temperature coefficient of resistance α of the semiconductor ceramic composition described in Patent Document 3 is about 8%/° C. However, a larger temperature coefficient of resistance α as well as a specific resistance at a normal temperature suitable for practical use is expected.

In view of such actual circumstances, the present invention aims to provide a $BaTiO_3$ based semiconductor ceramic composition without using Pb and with a Curie temperature shifted to higher than 120° C., which can be easily made into a semiconductor by sintering under any of an air atmosphere or a nitrogen atmosphere, and is excellent in the temperature coefficient of resistance α while having a specific resistance at a normal temperature maintained in a level suitable for practical use, and to provide a PTC thermistor.

The inventors of the present invention have performed various studies to solve the problems, and have obtained a semiconductor ceramic composition which can be easily made into a semiconductor in a sintering process under any of an air atmosphere or a nitrogen atmosphere, and has a large temperature coefficient of resistance α and a Curie temperature shifted to higher than 120° C., while having a specific resistance at a normal temperature suppressed to $10^3$ Ωcm or less, by using a specified concentration of Bi and alkali metal A (Na or K) rather than Pb to substitute a part of Ba and adjusting the mole ratio of the Ba sites/Ti sites and the additive amount of Ca to a specified range in the BaTiO$_3$ based semiconductor ceramic composition.

The inventors believe that, as for the reasons for such performances, by controlling the ratio of Bi and alkali metal A (Na or K) in a way that A is excessive, the excessive A will promote the forming of a semiconductor and will promote an appropriate grain growing as a sintering agent. Therefore, a semiconductor ceramic composition with a low resistance can be obtained in a sintering process under any of an air atmosphere or a nitrogen atmosphere. In addition, a semiconductor ceramic composition with excellent temperature coefficient of resistance α can be obtained by controlling the mole ratio of Ba sites/Ti sites in a way that Ti sites is excessive and further controlling the additive amount of Ca to a specified range which promote the grain growth. However, the mechanism for the forming of a semiconductor is not restricted to this.

That is, the present invention relates to a semiconductor ceramic composition characterized in that it comprises a sintered body with a main component of BaTiO$_3$ based compound represented by the following formula (1),

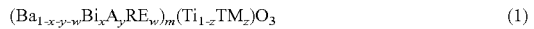

$$(Ba_{1-x-y-w}Bi_xA_yRE_w)_m(Ti_{1-z}TM_z)O_3 \quad (1)$$

wherein, in the above formula (1), A is at least one element selected from Na or K, RE is at least one element selected from the group consisting of Y, La, Ce, Pr, Nd, Sm, Gd, Dy and Er, TM is at least one element selected from the group consisting of V, Nb and Ta, w, x, y, z (the units of which are all mol) and m (the mole ratio of Ba sites/Ti sites) satisfies the following relationships of (2)~(5), $$0.007 \leq x \leq 0.125 \quad (2)$$

$$x < y \leq 2.0x \quad (3)$$

$$0 \leq (w+z) \leq 0.01 \quad (4)$$

$$0.94 \leq m \leq 0.999 \quad (5)$$

the sintered body comprises 0.01 mol or more and 0.055 mol or less of Ca in terms of element relative to 1 mol of Ti sites.

In addition, said semiconductor ceramic composition preferably further comprises Si in a proportion of 0.035 mol or less in terms of element relative to 1 mol of Ti sites. An effect of decreasing the specific resistance at a normal temperature can be achieved by comprising Si in said range.

Said semiconductor ceramic composition preferably further comprises Mn in a proportion of 0.0015 mol or less in terms of element relative to 1 mol of Ti sites. An effect of improving the temperature coefficient of resistance α can be achieved by comprising Mn in said range.

Further, the present invention also provides a PTC thermistor including the semiconductor ceramic composition. According to the present invention, a PTC thermistor such as a heater, an over current protection element, an overheat detection sensor or the like can be provided.

According to the present invention, in the BaTiO$_3$ based semiconductor ceramic composition, a semiconductor ceramic composition which can be easily made into a semiconductor in a sintering process under any of an air atmosphere or a nitrogen atmosphere, and has a small specific resistance at a normal temperature of $10^3$ Ωcm or less, a large temperature coefficient of resistance α of 20%/° C. or more and a Curie temperature shifted to higher than 120° C., can be obtained. The semiconductor ceramic composition according to the present invention is particularly suitable for overheat detection sensor, over current protection element, and heater.

BRIEF DESCRIPTION OF THE DRAWINGS

FIG. 1 is a schematic perspective view of the PTC thermistor of the embodiment of the present invention.

DETAILED DESCRIPTION OF EMBODIMENTS

FIG. 1 is a schematic perspective view of the PTC thermistor of one embodiment of the present invention. PTC thermistor 1 consists of a ceramic body 2 and electrodes 3a and 3b which are formed on the two opposite main surfaces of the ceramic body. The ceramic body is a sintered body, and is a semiconductor ceramic composition with a main component of a BaTiO$_3$ based compound represented by the following formula (1). On the other hand, Ni, Al, Cr or Ni—Cr alloy and the like can be used as electrodes 3a and 3b.

The semiconductor ceramic composition of the present invention comprises a compound represented by the following formula (1) as a main component, and further comprises Ca as a minor component.

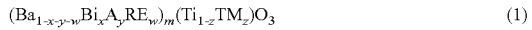

$$(Ba_{1-x-y-w}Bi_xA_yRE_w)_m(Ti_{1-z}TM_z)O_3 \quad (1)$$

(wherein, A is at least one element selected from Na or K, RE is at least one element selected from the group consisting of Y, La, Ce, Pr, Nd, Sm, Gd, Dy and Er, TM is at least one element selected from the group consisting of V, Nb and Ta.)

In the above formula (1), w, x, y, z and m which represent the substituted amount of a part of Ba sites by Bi, A, and RE, the substituted amount of Ti sites by TM, and the ratio of Ba sites and Ti sites respectively, satisfy the following relationships of (2)~(5), wherein the substitution of Ba sites by RE and the substitution of Ti sites by TM are arbitrary.

$$0.007 \leq x \leq 0.125 \quad (2)$$

$$x < y \leq 2.0x \quad (3)$$

$$0 \leq (w+z) \leq 0.01 \quad (4)$$

$$0.94 \leq m \leq 0.999 \quad (5)$$

Further, in the composition represented by formula (1), 0.01 mol or more and 0.055 mol or less of Ca in terms of element is comprised relative to 1 mol of Ti sites.

In addition, said semiconductor ceramic composition preferably further comprises Si in a proportion of 0.035 mol or less, more preferably 0.005 mol or more and 0.02 mol or less, in terms of element relative to 1 mol of Ti sites. The Si precipitated in the grain boundaries can form a compound with an alkali metal A precipitated in a micro amount in the same grain boundaries, and the movement of the alkali metal A ions when charged can be suppressed. Thus, an effect of decreasing the specific resistance at a normal temperature is achieved. However, if the amount of Si exceeds 0.035 mol, the excessive Si element will precipitate in a large amount in the grain boundaries, and will prevent the movement of the conducting electrons leading to the increase of the specific resistance at a normal temperature.

Further, said semiconductor ceramic composition preferably further comprises Mn in a proportion of 0.0015 mol or less, more preferably 0.0005 mol or more and 0.001 mol or less, in terms of element relative to 1 mol of Ti sites. When Mn is comprised in such a range, appropriate acceptor level is formed in the grain boundaries, and there is an effect of improving the temperature coefficient of resistance α. However, if the amount of Mn exceeds 0.0015 mol, the traps for the conducting electrons will be excessive, and the specific resistance at a normal temperature will increase.

In the formula (1), the amount range x of the component of Bi is $0.007 \leq x \leq 0.125$. The Curie temperature will not shift to a higher temperature when x is less than 0.007. In addition, if x exceeds 0.125, the forming to the semiconductor will be insufficient and the specific resistance at a normal temperature will be more than $10^3$ Ωcm. The Curie temperature of the present invention refers to the temperature under which the specific resistance of the element is twice compared to the one under 25° C.

In the formula (1), A is at least one element selected from Na or K, and the amount range y of A is related to the amount range x of Bi which satisfies $x<y \leq 2.0x$. The forming to the semiconductor will be insufficient and the specific resistance at a normal temperature will be more than $10^3$ Ωcm, if y is not larger than x. If y is larger than 2.0x, excessive A will precipitate in a large amount in the grain boundaries, and prevent the movement of the conducting electrons and the specific resistance at a normal temperature will be more than $10^3$ Ωcm.

Moreover, between the case that said alkali metal A is Na and the case that said alkali metal A is K, there will be some difference in the shift amounts of the Curie temperature to the higher temperature side, however, the variations of the specific resistance at a normal temperature and the temperature coefficient of resistance α are almost the same.

Additionally, in the formula (1), as for (w+z) which is the total amount of the donor components of RE and TM, if (w+z) is not large than 0.01 mol relative to 1 mol of Ti sites, there is an effect of decreasing the specific resistance at a normal temperature. And (w+z) may also be 0. If the balances of specific resistance at a normal temperature and the temperature coefficient of resistance α are considered, it is more preferably 0.001 mol or more and 0.005 mol or less. If (w+z) exceeds 0.01, the undissolved elements will precipitate in the grain boundaries, and inhibit the movement of the conducting electrons, and the specific resistance at a normal temperature will be more than $10^3$ Ωcm. Moreover, it is more preferable to select Sm, Gd, and Er as RE, and select Nb as TM. Further, it is preferred to add equal amounts of RE (Sm, Gd, Er) and TM (Nb). The effect of decreasing the specific resistance at a normal temperature will be enhanced with the above donor components and the addition methods.

In the formula (1), m (mole ratio of Ba sites/Ti sites) is preferably in a range of $0.94 \leq m \leq 0.999$, and more preferably in a range of $0.95 < m < 0.96$. The effect of decreasing the specific resistance at a normal temperature will be enhanced within such a range. The forming to the semiconductor will be insufficient and the specific resistance at a normal temperature will be more than $10^3$ Ωcm, if m is less than 0.94. On the other hand, if m exceeds 0.999, the density of the sintered body will decrease, and the specific resistance at a normal temperature will be more than $10^3$ Ωcm.

Further, in addition to the BaTiO$_3$ based compound represented by said formula (1), the semiconductor ceramic composition of the present embodiment comprises Ca as a minor component. The amount range of the added Ca is 0.01 mol or more and 0.055 mol or less in terms of element relative to 1 mol of Ti sites. And more preferably the range is 0.03 mol or more and 0.04 mol or less. The specific resistance at a normal temperature will be further decreased when the amount of Ca is in such a range.

If the amount range of Ca is less than 0.01 mol, the forming to the semiconductor will be insufficient and the specific resistance at a normal temperature will be more than $10^3$ Ωcm. On the other hand, if the amount range of Ca exceeds 0.055 mol, the density of the sintered body will decrease, and the specific resistance at a normal temperature will be more than $10^3$ Ωcm.

The semiconductor ceramic composition of the present embodiment is obtained by mixing and calcining the compounds comprising the elements which constitute the composition represented by the above formula, pulverizing the calcined powder, and then adding a binder to make granulated powder and molding, debinding and sintering. The sintering can be carried out both in air atmosphere and nitrogen atmosphere. However, if it is carried out in nitrogen atmosphere, a further heat-treatment in an oxidation atmosphere under 800~1000° C. is necessary. Thus, sintering in air atmosphere is preferred from the viewpoint of simplifying the process.

The PTC thermistor is composed of a ceramic body which consists of the semiconductor ceramic composition with BaTiO$_3$ based compound as a main component, and electrodes which are Ni, Al, Cr or Ni—Cr alloy and the like. The electrodes can be formed by plating, sputtering, screen printing and the like. In addition, the shape of the PTC thermistor may be a disc plate shape, a cuboid shape, or a laminated structure with several electrodes in the inner of the ceramic body.

EXAMPLES

Hereinafter, the present invention is further specifically described based on the examples and the comparative examples. However the present invention is not intended to be restricted by any of the following examples.

Example 1

Samples NO. 1~69

Comparative Example 1~29

As for the starting materials, BaCO$_3$, TiO$_2$, Bi$_2$O$_3$, Na$_2$CO$_3$, K$_2$CO$_3$, CaCO$_3$, SiO$_2$, oxides of RE (for example, Y$_2$O$_3$), and oxides of TM (for example, Nb$_2$O$_5$) were prepared, and all the materials were weighed in a way that the composition after sintering would be as shown in tables 1~7. After wet-mixed in acetone with a ball mill, the mixture was dried and calcined for 2 hours under 900° C.

The calcined body was wet-pulverized in pure water using a ball mill, and after that dehydration and drying were carried out. Then it was granulated using binders such as PVA and the like to obtain granulated powder. The granulated powder was molded into a cylindrical shape (diameter of 17 mm×thickness of 1.0 mm) with a uniaxial press machine, and then sintered in air atmosphere under 1200° C. for 2 hours to obtain a sintered body.

Ag—Zn paste was coated by screen printing on the two surfaces of the sintered body and then baked in air atmosphere under 500~700° C. Then the measuring of the specific resistance over temperature was carried out from 25° C. to 280° C. The results of example 1 of the present invention was shown in tables 1~5.

The temperature coefficient of resistance α was defined as the following formula.

$$\alpha=(\ln R_1 - \ln R_C) \times 100/(T_1 - T_c)$$

Wherein, $R_1$ was the specific resistance under $T_1$, $T_1$ was the temperature of $T_C+20°$ C., Tc was the Curie temperature, and $R_C$ was the specific resistance under $T_C$.

Example 2

Sample NO. 70

A semiconductor ceramic composition was prepared in the same way as Example 1, except that the atmosphere in the process of sintering was set to be nitrogen atmosphere, and the heat-treatment was carried out in air atmosphere under 800° C. And the evaluation was carried out in the same way as Example 1. The results of Example 2 according to the present invention were shown in table 6.

From table 1, it could be known that there was a relationship between the amount range of Bi (i.e., x) and the Curie temperature. From samples NO. 1~10, it could be known that when the amount of Bi was in the range of $0.007 \leq x \leq 0.125$, the Curie temperature shifted to a temperature higher than 120° C. which is the Curie temperature of $BaTiO_3$, and the specific resistance at a normal temperature was $10^3$ Ωcm or less. In addition, it could be known that the more the amount of x was, the higher the Curie temperature shifted to, and the specific resistance at a normal temperature tended to increase slightly. In the comparative example 1 and example 3 in which the amount range of the Bi element was less than 0.007, the specific resistance at a normal temperature was small, but the Curie temperature did not shift to a temperature higher than 120° C. Moreover, it could be known that in the comparative example 2 and example 4 in which the amount range of the A element exceeded 0.125, the specific resistance at a normal temperature was far more than $10^3$ Ωcm.

TABLE 1

| Sample NO. | x[mol] 0.007~0.125 | y[mol] x~2.0x | m 0.940~0.999 | Ca[mol] 0.010~0.055 | w + z [mol] 0~0.010 | Si[mol] 0~0.035 | Mn[mol] 0~0.0015 |
|---|---|---|---|---|---|---|---|
| Comparative Example 1 | 0.005 | 0.01 | 0.999 | 0.055 | 0 | 0 | 0 |
| 1 | 0.007 | 0.014 | | | | | |
| 2 | 0.03 | 0.06 | | | | | |
| 3 | 0.05 | 0.1 | | | | | |
| 4 | 0.1 | 0.2 | | | | | |
| 5 | 0.125 | 0.25 | | | | | |
| Comparative Example 2 | 0.127 | 0.254 | | | | | |
| Comparative Example 3 | 0.005 | 0.01 | 0.999 | 0.055 | 0 | 0 | 0 |
| 6 | 0.007 | 0.014 | | | | | |
| 7 | 0.03 | 0.06 | | | | | |
| 8 | 0.05 | 0.1 | | | | | |
| 9 | 0.1 | 0.2 | | | | | |
| 10 | 0.125 | 0.25 | | | | | |
| Comparative Example 4 | 0.127 | 0.254 | | | | | |

| Sample NO. | specific resistance at 25° C. [Ωcm] | Tc [° C.] | A Na or K | temperature coefficient of resistance α[%/° C.] | Note |
|---|---|---|---|---|---|
| Comparative Example 1 | 450 | 120 | Na | 27 | Curie temperature × |
| 1 | 450 | 125 | | 27 | |
| 2 | 600 | 135 | | 30 | |
| 3 | 700 | 155 | | 32 | |
| 4 | 850 | 195 | | 31 | |
| 5 | 850 | 220 | | 30 | |
| Comparative Example 2 | 1.5E+06 | — | | — | specific resistance at 25° C.× |
| Comparative Example 3 | 400 | 120 | K | 27 | Curie temperature × |
| 6 | 500 | 125 | | 28 | |
| 7 | 650 | 150 | | 31 | |
| 8 | 700 | 185 | | 32 | |
| 9 | 850 | 220 | | 32 | |
| 10 | 850 | 245 | | 32 | |
| Comparative Example 4 | 1.5E+06 | — | | — | specific resistance at 25° C. × |

It could be known from table 2 that, the amount range y of A was related to the amount range x of Bi element. In addition, A was at least one element selected from Na or K. It could be known from Samples No. 1, No. 3, No. 5 and No. 12, No. 14, No. 16 that, if the amount y was in the range of $x<y \leq 2.0x$, the specific resistance at a normal temperature would be small and the temperature coefficient of resistance α could be maintained to 20%/° C. or more. In addition, if x was fixed, there was a tendency that the specific resistance at a normal temperature decreased slightly with the increase of y. In the comparative examples 5, 6, 8, 9, 11, 12 in which the amount range of y was less than x, the specific resistance at a normal temperature was small, but the temperature coefficient of resistance α was less than 20%/° C. Additionally, in comparative example 7, comparative example 10, and comparative example 13 in which the amount range of y was larger than 2.0x, the specific resistance at a normal temperature increased and became more than $10^3$ Ωcm. Moreover, it was known that between the case that A was Na and the case that A was K, there was some difference in the shift amount of the Curie temperature to the higher temperature, but the specific resistance at a normal temperature and the temperature coefficient of resistance α were almost the same.

It could be known from table 3 that, the mole ratio m of Ba sites/Ti sites was related to the specific resistance at a normal temperature. And it was known that in the samples NO. 5, 17, 18 in which m was in the range of $0.94 \leq m \leq 0.999$, the specific resistance at a normal temperature was small and the temperature coefficient of resistance α shifted to 20%/° C. or more. Additionally, the specific resistance at a normal temperature and the temperature coefficient of resistance α tended to increase slightly with the increase of m. In the comparative example 14 in which m was less than 0.94, the specific resistance at a normal temperature was as large as $10^3$ Ωcm and the temperature coefficient of resistance α was small. Moreover, in the comparative example 15 in which m

TABLE 2

| Sample NO. | x[mol] 0.007~0.125 | y[mol] x~2.0x | m 0.940~0.999 | Ca[mol] 0.010~0.055 | w + z [mol] 0~0.010 | Si[mol] 0~0.035 | Mn[mol] 0~0.0015 |
|---|---|---|---|---|---|---|---|
| Comparative Example 5 | 0.007 | 0.0056 | 0.999 | 0.055 | 0 | 0 | 0 |
| Comparative Example 6 | | 0.007 | | | | | |
| 12 | | 0.0105 | | | | | |
| 1 | | 0.014 | | | | | |
| Comparative Example 7 | | 0.0154 | | | | | |
| Comparative Example 8 | 0.05 | 0.04 | 0.999 | 0.055 | 0 | 0 | 0 |
| Comparative Example 9 | | 0.05 | | | | | |
| 14 | | 0.075 | | | | | |
| 3 | | 0.1 | | | | | |
| Comparative Example 10 | | 0.11 | | | | | |
| Comparative Example 11 | 0.125 | 0.1 | 0.999 | 0.055 | 0 | 0 | 0 |
| Comparative Example 12 | | 0.125 | | | | | |
| 16 | | 0.1875 | | | | | |
| 5 | | 0.25 | | | | | |
| Comparative Example 13 | | 0.275 | | | | | |

| Sample NO. | specific resistance at 25° C. [Ωcm] | Tc [° C.] | A Na or K | temperature coefficient of resistance α [%/° C.] | Note |
|---|---|---|---|---|---|
| Comparative Example 5 | 1200 | 125 | Na | 12 | temperature coefficient of resistance □ × |
| Comparative Example 6 | 850 | | | 14 | temperature coefficient of resistance □ × |
| 12 | 500 | | | 26 | |
| 1 | 450 | | | 27 | |
| Comparative Example 7 | 1.0E+05 | | | — | specific resistance at 25° C. × |
| Comparative Example 8 | 1000 | 155 | Na | 15 | temperature coefficient of resistance □ × |
| Comparative Example 9 | 900 | | | 16 | temperature coefficient of resistance □ × |
| 14 | 750 | | | 28 | |
| 3 | 700 | | | 32 | |
| Comparative Example 10 | 1.00E+04 | | | — | specific resistance at 25° C. × |
| Comparative Example 11 | 950 | 220 | Na | 16 | temperature coefficient of resistance □ × |
| Comparative Example 12 | 900 | | | 16 | temperature coefficient of resistance □ × |
| 16 | 900 | | | 30 | |
| 5 | 850 | | | 30 | |
| Comparative Example 13 | 1.0E+05 | | | — | specific resistance at 25° C.× | exceeded 0.99, the specific resistance at a normal temperature was more than $10^3$ Ωcm and the forming to a semiconductor was insufficient.

It could be known from the samples of NO. 5, 28~69 of Table 5 that, if (w+z) which represented the total amount of RE and TM was not larger than 0.01, there was an effect of

TABLE 3

| Sample NO. | x[mol] 0.007~0.125 | y[mol] x~2.0x | m 0.940~0.999 | Ca[mol] 0.010~0.055 | w + z [mol] 0~0.010 | Si[mol] 0~0.035 | Mn[mol] 0~0.0015 |
|---|---|---|---|---|---|---|---|
| Comparative Example 14 | 0.125 | 0.25 | 0.92 | 0.055 | 0 | 0 | 0 |
| 17 | | | 0.94 | | | | |
| 18 | | | 0.97 | | | | |
| 5 | | | 0.999 | | | | |
| Comparative Example 15 | | | 1.02 | | | | |

| Sample NO. | specific resistance at 25° C. [Ωcm] | Tc [° C.] | A Na or K | temperature coefficient of resistance α [%/° C.] | Note |
|---|---|---|---|---|---|
| Comparative Example 14 | 5.E+03 | 220 | Na | 2 | temperature coefficient of resistance × |
| 17 | 500 | | | 35 | |
| 18 | 450 | | | 35 | |
| 5 | 850 | | | 30 | |
| Comparative Example 15 | 1.E+05 | | | — | temperature coefficient of resistance × |

It could be known from table 4 that, the amount range of the minor component Ca was related to the specific resistance at a normal temperature. In the samples of No. 5, 19, 20 in which the amount of Ca was in the range of 0.01 mol or more and 0.055 mol or less, the specific resistance at a normal temperature was small and the temperature coefficient of resistance α was maintained to 20%/° C. or more. Moreover, the specific resistance at a normal temperature tended to increase slightly with the increase of the amount of Ca. As for the comparative example 16 in which the amount range of Ca was less than 0.01 mol and the comparative example 17 in which the amount range of Ca exceeded 0.055 mol, the specific resistance at a normal temperature increased and were more than $10^3$ Ωcm, decreasing the specific resistance at a normal temperature. Moreover, if balances of the specific resistance at a normal temperature and the temperature coefficient of resistance α were considered, (w+z) was more preferred to be 0.001 mol or more and 0.005 mol or less. In addition, it was known that in the case that RE was Sm, Gd or Er, and TM was Nb, the specific resistance at a normal temperature was smaller than that in the cases of other RE and TM. Additionally, as for the comparative examples 18~30 in which (w+z) exceeded 0.01, the specific resistance at a normal temperature was more than $10^3$ Ωcm. Further, from the samples of NO. 64~69, it could be known that even among the cases that the values of (w+z) were the same, the samples in which RE and TM were added in equal amount had smaller specific resistances at a normal temperature.

TABLE 4

| Sample NO. | x[mol] 0.007~0.125 | y[mol] x~2.0x | m 0.940~0.999 | Ca[mol] 0.010~0.055 | w + z [mol] 0~0.010 | Si[mol] 0~0.035 | Mn[mol] 0~0.0015 |
|---|---|---|---|---|---|---|---|
| Comparative Example 16 | 0.125 | 0.25 | 0.999 | 0.008 | 0 | 0 | 0 |
| 19 | | | | 0.01 | | | |
| 20 | | | | 0.03 | | | |
| 5 | | | | 0.055 | | | |
| Comparative Example 17 | | | | 0.058 | | | |

| Sample NO. | specific resistance at 25° C.[Ωcm] | Tc [° C.] | A Na or K | temperature coefficient of resistance α [%/° C.] | Note |
|---|---|---|---|---|---|
| Comparative Example 16 | 5.0E+04 | 220 | Na | — | temperature coefficient of resistance × |
| 19 | 600 | | | 30 | |
| 20 | 650 | | | 35 | |
| 5 | 850 | | | 30 | |
| Comparative Example 17 | 1.0E+04 | | | — | temperature coefficient of resistance × |

TABLE 5

| Sample NO. | x[mol] 0.007~0.125 | y[mol] x~2.0x | m 0.940~0.999 | Ca[mol] 0.010~0.055 | Si[mol] 0~0.035 | Mn[mol] 0~0.0015 | RE | TM |
|---|---|---|---|---|---|---|---|---|
| 5 | 0.125 | 0.25 | 0.999 | 0.055 | 0 | 0 | Y | |
| 28 | | | | | | | | |
| 29 | | | | | | | | |
| 30 | | | | | | | | |
| Comparative Example 18 | | | | | | | | |
| 31 | 0.125 | 0.25 | 0.999 | 0.055 | 0 | 0 | La | |
| 32 | | | | | | | | |
| 33 | | | | | | | | |
| Comparative Example 19 | | | | | | | | |
| 34 | 0.125 | 0.25 | 0.999 | 0.055 | 0 | 0 | Ce | |
| 35 | | | | | | | | |
| 36 | | | | | | | | |
| Comparative Example 20 | | | | | | | | |
| 37 | 0.125 | 0.25 | 0.999 | 0.055 | 0 | 0 | Pr | |
| 38 | | | | | | | | |
| 39 | | | | | | | | |
| Comparative Example 21 | | | | | | | | |
| 40 | 0.125 | 0.25 | 0.999 | 0.055 | 0 | 0 | Nd | |
| 41 | | | | | | | | |
| 42 | | | | | | | | |
| Comparative Example 22 | | | | | | | | |
| 43 | 0.125 | 0.25 | 0.999 | 0.055 | 0 | 0 | Sm | |
| 44 | | | | | | | | |
| 45 | | | | | | | | |
| Comparative Example 23 | | | | | | | | |
| 46 | 0.125 | 0.25 | 0.999 | 0.055 | 0 | 0 | Gd | |
| 47 | | | | | | | | |
| 48 | | | | | | | | |
| Comparative Example 24 | | | | | | | | |
| 49 | 0.125 | 0.25 | 0.999 | 0.055 | 0 | 0 | Dy | |
| 50 | | | | | | | | |
| 51 | | | | | | | | |
| Comparative Example 25 | | | | | | | | |
| 52 | 0.125 | 0.25 | 0.999 | 0.055 | 0 | 0 | Er | |
| 53 | | | | | | | | |
| 54 | | | | | | | | |
| Comparative Example 26 | | | | | | | | |
| 55 | 0.125 | 0.25 | 0.999 | 0.055 | 0 | 0 | | V |
| 56 | | | | | | | | |
| 57 | | | | | | | | |
| Comparative Example 27 | | | | | | | | |
| 58 | 0.125 | 0.25 | 0.999 | 0.055 | 0 | 0 | | |
| 59 | | | | | | | | |
| 60 | | | | | | | | Nb |
| Comparative Example 28 | | | | | | | | |
| 61 | 0.125 | 0.25 | 0.999 | 0.055 | 0 | 0 | | Ta |
| 62 | | | | | | | | |
| 63 | | | | | | | | |
| Comparative Example 29 | | | | | | | | |
| 64 | 0.125 | 0.25 | 0.999 | 0.055 | 0 | 0 | Gd | Nb |
| 65 | | | | | | | | |
| 66 | | | | | | | | |
| 67 | | | | | | | | |
| 68 | | | | | | | | |
| 69 | | | | | | | | |
| Comparative Example 30 | | | | | | | | |

TABLE 5-continued

| Sample NO. | w[mol] 0~0.01 | z[mol] | specific resistance (25° C.) [Ωcm] | Tc [° C.] | A Na or K | temperature coefficient of resistance α [%/° C.] | Note |
|---|---|---|---|---|---|---|---|
| 5 | 0 | 0 | 850 | 220 | Na | 30 | |
| 28 | 0.001 | 0 | 700 | | | 31 | |
| 29 | 0.005 | 0 | 600 | | | 31 | |
| 30 | 0.01 | 0 | 650 | | | 31 | |
| Comparative Example 18 | 0.012 | 0 | 4800 | | | 11 | specific resistance at 25° C. × |
| 31 | 0.001 | 0 | 700 | 220 | Na | 31 | |
| 32 | 0.005 | 0 | 600 | | | 30 | |
| 33 | 0.01 | 0 | 650 | | | 31 | |
| Comparative Example 19 | 0.012 | 0 | 8000 | | | 8 | specific resistance at 25° C. × |
| 34 | 0.001 | 0 | 700 | 220 | Na | 30 | |
| 35 | 0.005 | 0 | 650 | | | 29 | |
| 36 | 0.01 | 0 | 700 | | | 30 | |
| Comparative Example 20 | 0.012 | 0 | 7000 | | | 10 | specific resistance at 25° C. × |
| 37 | 0.001 | 0 | 750 | 220 | Na | 30 | |
| 38 | 0.005 | 0 | 650 | | | 28 | |
| 39 | 0.01 | 0 | 700 | | | 31 | |
| Comparative Example 21 | 0.012 | 0 | 4000 | | | 12 | specific resistance at 25° C. × |
| 40 | 0.001 | 0 | 700 | 220 | Na | 28 | |
| 41 | 0.005 | 0 | 650 | | | 29 | |
| 42 | 0.01 | 0 | 700 | | | 29 | |
| Comparative Example 22 | 0.012 | 0 | 7000 | | | 8 | specific resistance at 25° C. × |
| 43 | 0.001 | 0 | 500 | 220 | Na | 30 | |
| 44 | 0.005 | 0 | 550 | | | 30 | |
| 45 | 0.01 | 0 | 700 | | | 30 | |
| Comparative Example 23 | 0.012 | 0 | 5000 | | | 12 | specific resistance at 25° C. × |
| 46 | 0.001 | 0 | 700 | 220 | Na | 28 | |
| 47 | 0.005 | 0 | 600 | | | 30 | |
| 48 | 0.01 | 0 | 650 | | | 31 | |
| Comparative Example 24 | 0.012 | 0 | 3000 | | | 14 | specific resistance at 25° C. × |
| 49 | 0.001 | 0 | 700 | 220 | Na | 30 | |
| 50 | 0.005 | 0 | 600 | | | 28 | |
| 51 | 0.01 | 0 | 650 | | | 28 | |
| Comparative Example 25 | 0.012 | 0 | 4000 | | | 12 | specific resistance at 25° C. × |
| 52 | 0.001 | 0 | 550 | 220 | Na | 32 | |
| 53 | 0.005 | 0 | 550 | | | 30 | |
| 54 | 0.01 | 0 | 600 | | | 30 | |
| Comparative Example 26 | 0.012 | 0 | 5500 | | | 9 | specific resistance at 25° C. × |
| 55 | 0 | 0.001 | 700 | 220 | Na | 30 | |
| 56 | 0 | 0.005 | 700 | | | 30 | |
| 57 | 0 | 0.01 | 700 | | | 30 | |
| Comparative Example 27 | 0 | 0.012 | 12000 | | | 8 | specific resistance at 25° C. × |
| 58 | 0 | 0.001 | 500 | 220 | Na | 28 | |
| 59 | 0 | 0.005 | 550 | | | 28 | |
| 60 | 0 | 0.01 | 700 | | | 29 | |
| Comparative Example 28 | 0 | 0.012 | 4000 | | | 10 | specific resistance at 25° C. × |
| 61 | 0 | 0.001 | 700 | 220 | Na | 30 | |
| 62 | 0 | 0.005 | 600 | | | 30 | |
| 63 | 0 | 0.01 | 700 | | | 28 | |
| Comparative Example 29 | 0 | 0.012 | 7000 | | | 9 | specific resistance at 25° C. × |
| 64 | 0.0025 | 0.0025 | 400 | 220 | Na | 33 | |
| 65 | 0.001 | 0.004 | 600 | | | 30 | |
| 66 | 0.004 | 0.001 | 600 | | | 33 | |

TABLE 5-continued

| | | | | | |
|---|---|---|---|---|---|
| 67 | 0.005 | 0.005 | 450 | 32 | |
| 68 | 0.002 | 0.008 | 700 | 30 | |
| 69 | 0.008 | 0.002 | 700 | 30 | |
| Comparative Example 30 | 0.006 | 0.006 | 11000 | 8 | specific resistance at 25 °C. × |

It could be known from the samples of NO. 5 and 70 in table 6 that, when the atmosphere during sintering was an atmosphere of nitrogen ($PO_2=10^{-7}$ atm), almost the same performance as that in the case of sintering in air atmosphere could be obtained.

TABLE 6

| Sample NO. | x[mol] 0.007~0.125 | y[mol] x~2.0x | m 0.940~0.999 | Ca[mol] 0.010~ | w+z [mol] 0~0.010 | Si[mol] 0~0.035 | Mn[mol] 0~0.0015 | specific resistance at 25° C. [Ωcm] | Tc [° C.] | A Na or K | temperature coefficient of resistance α [%/° C.] | Note |
|---|---|---|---|---|---|---|---|---|---|---|---|---|
| 5 | 0.125 | 0.25 | 0.999 | 0.055 | 0 | 0 | 0 | 850 | 220 | Na | 30 | in air |
| 70 | | | | | | | | 650 | | | 30 | in N2 |

DESCRIPTION OF REFERENCE NUMERALS

1 PTC thermistor
2 ceramic body
3a, 3b electrodes

What is claimed is:

1. A semiconductor ceramic composition comprising a sintered body which contains a $BaTiO_3$ based compound represented by the following formula (1) as a main component, $$(Ba_{1-x-y-w}Bi_xA_yRE_w)_m(Ti_{1-z}TM_z)O_3 \quad (1)$$

wherein, in the formula (1), A is at least one element selected from Na or K, RE is at least one element selected from the group consisting of Y, La, Ce, Pr, Nd, Sm, Gd, Dy and Er, TM is at least one element selected from the group consisting of V, Nb and Ta, w, x, y, z (all the units of which are mol) and m (which is the mole ratio of Ba sites/Ti sites) satisfy the following relationships of (2)~(5), $$0.007 \leq x \leq 0.125 \quad (2)$$

$$x < y \leq 2.0x \quad (3)$$

$$0 \leq (w+z) \leq 0.01 \quad (4)$$

$$0.94 \leq m \leq 0.999 \quad (5)$$

wherein, said semiconductor ceramic composition further comprises Ca in a proportion of 0.01 mol or more and 0.055 mol or less in terms of element relative to 1 mol of Ti sites.

2. The semiconductor ceramic composition of claim 1 further comprising Si in a proportion of 0.035 mol or less in terms of element relative to 1 mol of Ti sites.

3. The semiconductor ceramic composition of claim 1 further comprising Mn in a proportion of 0.0015 mol or less in terms of element relative to 1 mol of Ti sites.

4. A PTC thermistor comprising a ceramic body which is formed by the semiconductor ceramic composition of claim 1, and electrodes which are formed on the surfaces of said ceramic body.

5. The semiconductor ceramic composition of claim 2 further comprising Mn in a proportion of 0.0015 mol or less in terms of element relative to 1 mol of Ti sites.

6. A PTC thermistor comprising a ceramic body which is formed by the semiconductor ceramic composition of claim 2, and electrodes which are formed on the surfaces of said ceramic body.

7. A PTC thermistor comprising a ceramic body which is formed by the semiconductor ceramic composition of claim 3, and electrodes which are formed on the surfaces of said ceramic body.

8. A PTC thermistor comprising a ceramic body which is formed by the semiconductor ceramic composition of claim 5, and electrodes which are formed on the surfaces of said ceramic body.

* * * * *